United States Patent [19]
de Francisco-Sainz

[11] 4,124,446
[45] Nov. 7, 1978

[54] APPARATUS AND METHOD FOR FILTERING RADIOACTIVE LIQUID

[75] Inventor: José-Luis de Francisco-Sainz, Guecho-Algorta, Spain

[73] Assignee: Sener, Tecnica Industrial y Naval, S.A., Vizcaya, Spain

[21] Appl. No.: 744,594

[22] Filed: Nov. 24, 1976

[30] Foreign Application Priority Data

Nov. 25, 1975 [ES] Spain .................................... 442.921

[51] Int. Cl.² ............................................. G21C 15/00
[52] U.S. Cl. ......................................... 176/87; 176/37; 210/232; 210/251; 210/455
[58] Field of Search ................. 210/65, 232, 237, 238, 210/241, 455, 477, 479, 251; 176/30, 37; 250/506, 515, 517

[56] References Cited

U.S. PATENT DOCUMENTS

| 3,279,608 | 10/1966 | Soriente et al. ...................... | 210/232 |
| 3,838,289 | 9/1974 | White .................................... | 250/506 |
| 3,890,233 | 6/1975 | Gischel ................................. | 210/237 |
| 3,982,134 | 9/1976 | Housholder et al. ................. | 250/506 |

Primary Examiner—William A. Cuchlinski, Jr.
Attorney, Agent, or Firm—Wigman & Cohen

[57] ABSTRACT

A filtering system for the treatment of radioactive fluids, comprising filters with interchangeable filtering elements, positioned within a casing. The casing has a cover and the filter assembly is housed inside a radiation shielding chamber provided with an access opening. At least one opening is provided in the chamber wall opposite the filter which is closed with a removable filter casing cover. The casing cover is shaped to be received in the shielding chamber opening and when in position seals the casing. The cover is also designed to be received by a shielded cask for the transportation of the said filtering element when the spent element is removed and replaced. The filter element is suspended from the cover and hence is removed from the casing simultaneous with the removal of the cover. In the method according to this invention, removal of spent elements is effected without subjecting personnel to high radiation dosage since the filter elements are shielded at all times during removal.

12 Claims, 7 Drawing Figures

APPARATUS AND METHOD FOR FILTERING RADIOACTIVE LIQUID

BACKGROUND OF THE INVENTION

This invention relates to filters for the treatment of radioactive fluids generally used in the process systems of a nuclear power plant. More particularly, the filters of the present invention are of the type which include a casing with the filtering element mounted on the inside. The casing includes a cover and is housed inside a radiation shielding chamber. The chamber is provided with access openings which can be closed by means of radiation shielding gates or slabs. The filter is positioned behind one of the openings to provide access to the filter.

The filters used in the liquid process systems of nuclear power plants or radioactive installations are subjected to high levels of radioactivity. It is generally recognized that the main function of these filters is to retain radioactive corrosion products.

The problem which generally arises with filters which retain radioactive particles is not the loss of its filtering characteristics, but rather the build-up of the level of radioactivity. This build-up limits the operational conditions and affects the manner by which the filtering elements are changed, handled and disposed of. Experience has shown that costs associated with handling the spent filter elements are between ten and fifteen times, the cost of the filter element being changed.

Filters used in processing radioactive liquids in nuclear power plants or other installations trap high concentrations of radioactive corrosion particles or products on the inside, which give rise to a very high radiological dose rate in its vicinity. This means that it is necessary to handle the filters in special cells or rooms designated with adequate protection against radiations. Such rooms generally are constructed with walls, floor and roof made of materials of an adequate type and thickness to form a biological shielding against such radiation.

As earlier indicated, it is the high radiological dose rate which limits the operating time of the filtering elements in the majority of cases rather than the exhaustion of the filtering properties. The great increase in the radiological dose creates serious maintenance problems in the habitual filter installations, particularly during the element renewal operations.

Accordingly, in the design of a filter, or a bank of filters for a nuclear power plant or similar installation, factors such as the size of the filtering elements, the number of times it must be renewed per year, the permissible activity level, element renewal procedure, etc., must be taken into account.

In general, the appropriate design criteria for handling the filters are as follows:

1. During all the phases of filter element changing, the design must be capable of yielding a sufficiently low radiation level so as not to create problems for the installing operating personnel. The design shall be such that by following the operational sequences, the personnel shall not be exposed to level doses greater than the installation operational level doses, in accordance with the classification of the zones next to the filters.
2. The system must be capable of handling filtering elements with relatively high dose level, in the region of 500 R/hr, when in contact with the filter casing.
3. In principle, it must be guaranteed that there shall not be any need to impose special personnel limitations during the period when filtering elements are changed.

As previously mentioned, due to the high level of radiation which can be reached on the outside surface of the filters which treat radioactive liquids, the normal practice is to place the filters inside cells or cubicles enclosed by walls, floors and roofs of adequate materials and thicknesses to reduce the dose rates to acceptable values. These cells or cubicles are provided with access opening with closure slabs with at least one of these openings in front of the filter to provide access to the same. The conventional method for changing the cartridge, or filtering element requires removing the shielding slab of the cell or cubicle, after which the filter cover is removed. Once the slab or door of the cell or cubicle is removed, the radiation level is high, which means that the filter cover opening operation requires special remote control tools and/or additional shielding plates. Thus, the extraction of the filtering element from its environment requires a series of complex operations. However, once the shielding is removed there is a high radiation level which must be taken into account. After the filtering element is removed from the casing, it is usually placed inside a shielded cask for transportation. In the interim it is necessary to place a shielded cover or slab over the access opening of the same in order to close it. All these operations have to be carried out under a high level of radiation.

OBJECTS AND SUMMARY OF THE INVENTION

From the foregoing it will be seen that there exists a need for an improved filter for use in processing radioactive liquid waste which meet the operational criteria established. A primary object of this invention is to provide a filter which satisfies the radiological criteria set out hereinabove, minimizing the problems of exposure to radiation of personnel employed in changing filtering elements, so that doses received by personnel are kept down to minimum values. Another object of this invention is to provide a filtering system where the time employed in renewal operations are kept to a minimum, also simplifying this operation thereby making it more rapid, flexible and radiologically safe. A still further object of this invention is to provide a technique for filtering which is safe in operation, and results in a lower operating cost.

Summarizing, the present invention provides an installation in which the radiological exposure by personnel entrusted with the handling of spent filtering elements is kept to a minimum.

In accordance with the present invention, the operations described for the extraction of the filtering cartridge and its placing in the cask are carried out much more rapidly and above all with a minimum exposure to radiation.

The filter according to this invention includes a casing cover provided with external radiation shielding. The shielding forms part of the cover and is shaped to conform to the opening of the shielding chamber opposite the filter, to serve as a closing cover or slab for the opening. For purposes of convenience the cover with its shield shall hereinafter be referred to as "cover-shielding."

The filtering element is suspended from the cover-shielding of the casing.

The cover-shielding has passages on the upper and lower surfaces thereof for receiving adjusting bolts or other means for fastening the cover-shielding to the casing. These bolts or fastening means are operated from the upper surface of the cover-shielding.

In operation, when it is necessary to change the filtering element, the bolts of fastening means are loosened, which can be done by hand and with no danger from radiation because of the protection afforded by the cover-shielding. The bolts or fastening means are designed not to be removed from the cover-shielding, thereby providing adequate protection against radiation since the holes through which the radiation could flow remain closed. Once the fastening means are loosened, the operator can remove the cover-shielding and extract the filtering cartridge at the same time where the filtering element is suspended from the cover-shielding. By this simplified procedure the operator is not exposed to radiation as with the traditional manner of removing the filter cover after the gate or slab to the shielding chamber has been removed.

The filtering cartridge transportation cask has a shaped opening so that the cover-shielding of the filter casing fits on the cask. On removing the cover-shielding, with the filtering element hanging from it, the filter element can be placed directly into the cask, with the filter casing cover-shielding serving as a shielding and as the cask closing slab. As will be appreciated, by this procedure the number of operations is reduced and increased safety is provided since it is not necessary to place the filtering element inside the cask and then cover it. The entire procedure can be carried out in only one operation.

The filter element is transported to the cask with the filter element kept inside a shielded shell after removal of the element from the filter. This shell has a top-side opening into which the filter cover-shielding fits. During the extraction of the filter cartridge, this shell is placed on top of the shielding chamber, so that on raising the cover-shielding it rests against the upper opening of the shell, closing this opening. Immediately afterwards it is possible to place the shell safely on the cask.

Summing up, the operations to be carried out for extracting of the filtering element are reduced to loosening the fastening elements of the cover-shielding, placing the shell on the shielding chamber, lifting the cover-shielding with the cartridge hanging from it, transporting the whole assembly to the cask and lowering the cover-shielding until the cask is closed.

It can be seen that the number of operations is greatly reduced, with respect to the traditional system, and above all, radiation exposure of the personnel is greatly reduced.

In order to ensure maximum stability of the casing and cover-shielding assembly, and at the same time to simplify the design of the casing, the support of the said casing shall be made against the wall of the shielding chamber, for example, by means of a flange around the casing opening, or, by means of intermediate supports which connect the casing wall to the chamber wall.

BRIEF DESCRIPTION OF THE DRAWINGS

Having described the invention in general terms, reference is made to the attached drawings, wherein.

DETAILED DESCRIPTION OF A PREFERRED EMBODIMENT

Figure 1:
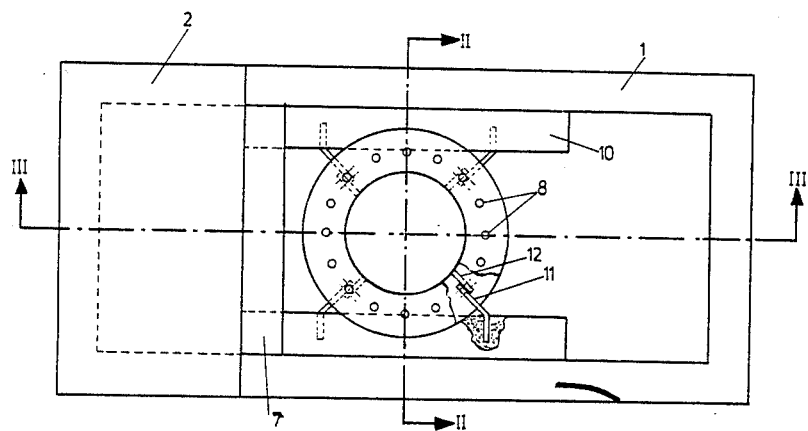
FIG. 1 is a plan view of a filter mounted in the shielding chamber according to the present invention.
Figure 3:
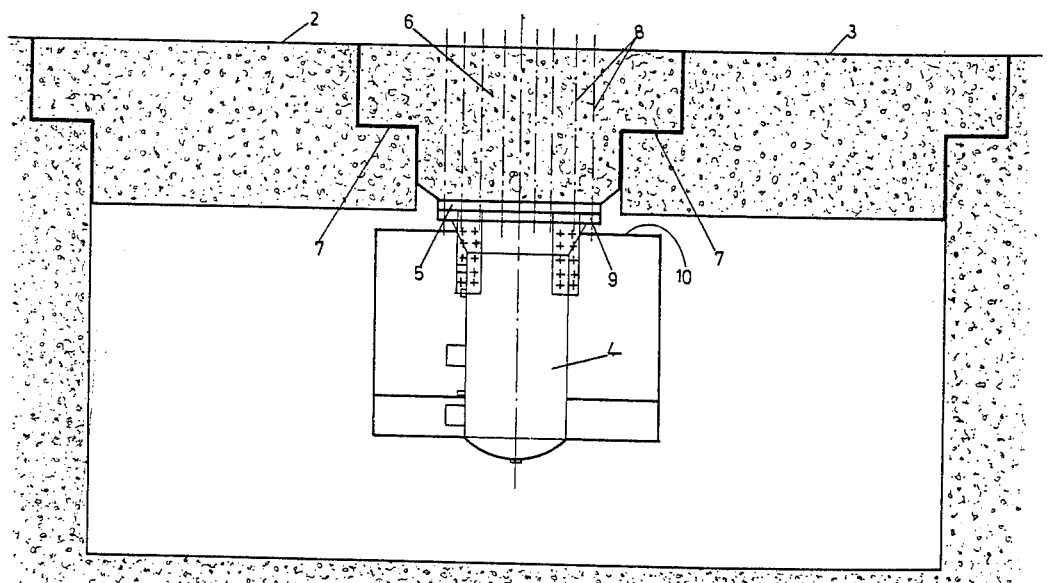
FIG. 3 is a sectional view, in elevation, taken substantially along the lines III—III of FIG. 1.
Figure 2:
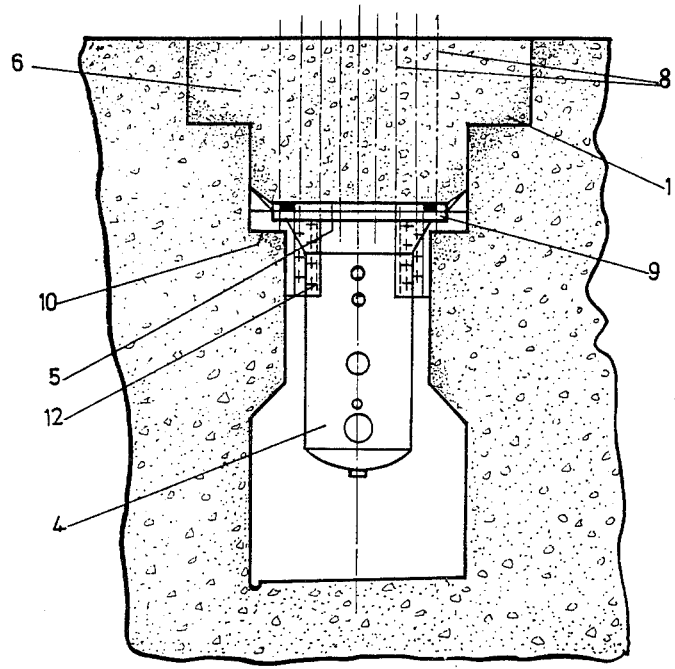
FIG. 2 is a partial sectional view, in elevation, taken substantially along the lines II—II of FIG. 1.

In FIGS. 1–3 a cell is shown, made up by an area bounded by walls formed of an adequate material e.g. concrete, and thickness to provide adequate radiological protection. All around its boundary, this cell includes a step 1, on which rest two outer slabs 2 and 3. In FIG. 1, only slab 2 is shown for clarity, while in FIG. 3 slabs 2 and 3 are shown. Inside the cell, the casing 4 which houses the filtering element is positioned. The casing 4 is closed by the cover 5 which has an outer radiation shielding 6. The shielding 6 forms an integral part of cover 5, to make up the assembly which has been previously designated the cover-shielding 5–6. The outer slabs 2 and 3 permit access to the inside of the cell. The cover-shielding 5–6 serve, at the same time, as a central slab and provides access to filter casing 4.

The shielding 6 and the cover 5 are pierced by a series of openings for receiving bolts or fastening elements 8 (depicted by broken lines). Fastening elements 8 are adapted to engage the casing 4 at flange 9 positioned at the upper periphery of the casing 4. The shielding 6 is designed to fill the space between slabs 2 and 3, and, along with the slabs 2 and 3, forms a stepped profile 7 which provides the required radiological shielding. The shielding 6 should never rest, at least rigidly, on the steps 1 and 7 to prevent the cover 5 from resting on the casing 4 to provide a fluid tight seal of the casing 4 under operating conditions, once the fastening elements 8 are tightened.

Naturally, the cells can also include additional auxiliary closable openings for access to the interior of the cell.

Figure 4:
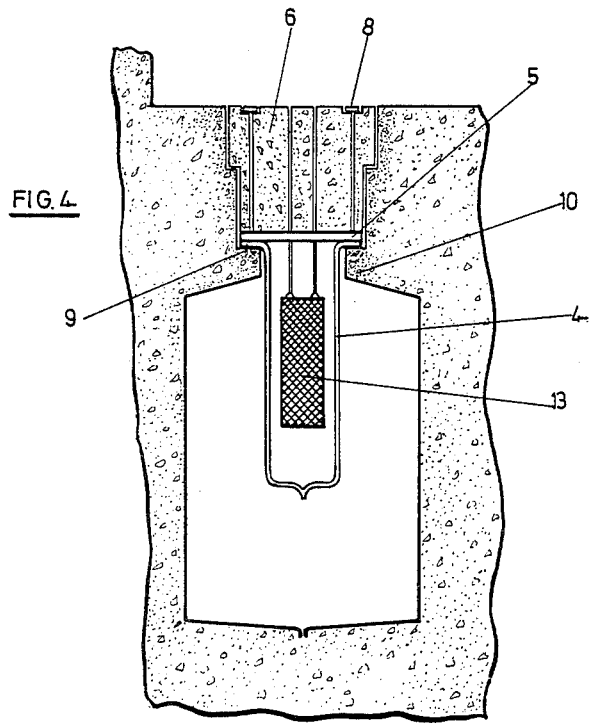
FIG. 4 is a partial sectional view similar to FIG. 2 and corresponding to a different embodiment of the present invention.

The cover 5 has to be well seated on the casing 4. Since the cover 5 is integrally formed with the shielding 6, it is recommended that the filter casing be supported by the cell walls. Casing 4 can be supported on step 10 provided under the sealing slabs by way of the flange 9, as shown in FIG. 4. On the other hand, from the structural point of view and with reference to its behaviour to dynamic stressing, the support should be located as high as possible, as the center of gravity of the filter cover-shielding assembly will probably be in the cover-shielding.

As shown in FIG. 1, a plurality of supports 11 which project from the cell walls are employed to rigidly connect with the supports 12 which form an integral part of casing 4. With this support system the casing is supported without the need to utilize the upper flange 9 as a support surface.

The cartridge or filtering element 13 is suspended from cover 5, so that by removing the cover-shielding 5–6, the filtering element 13 is extracted at the same time.

Figure 5:
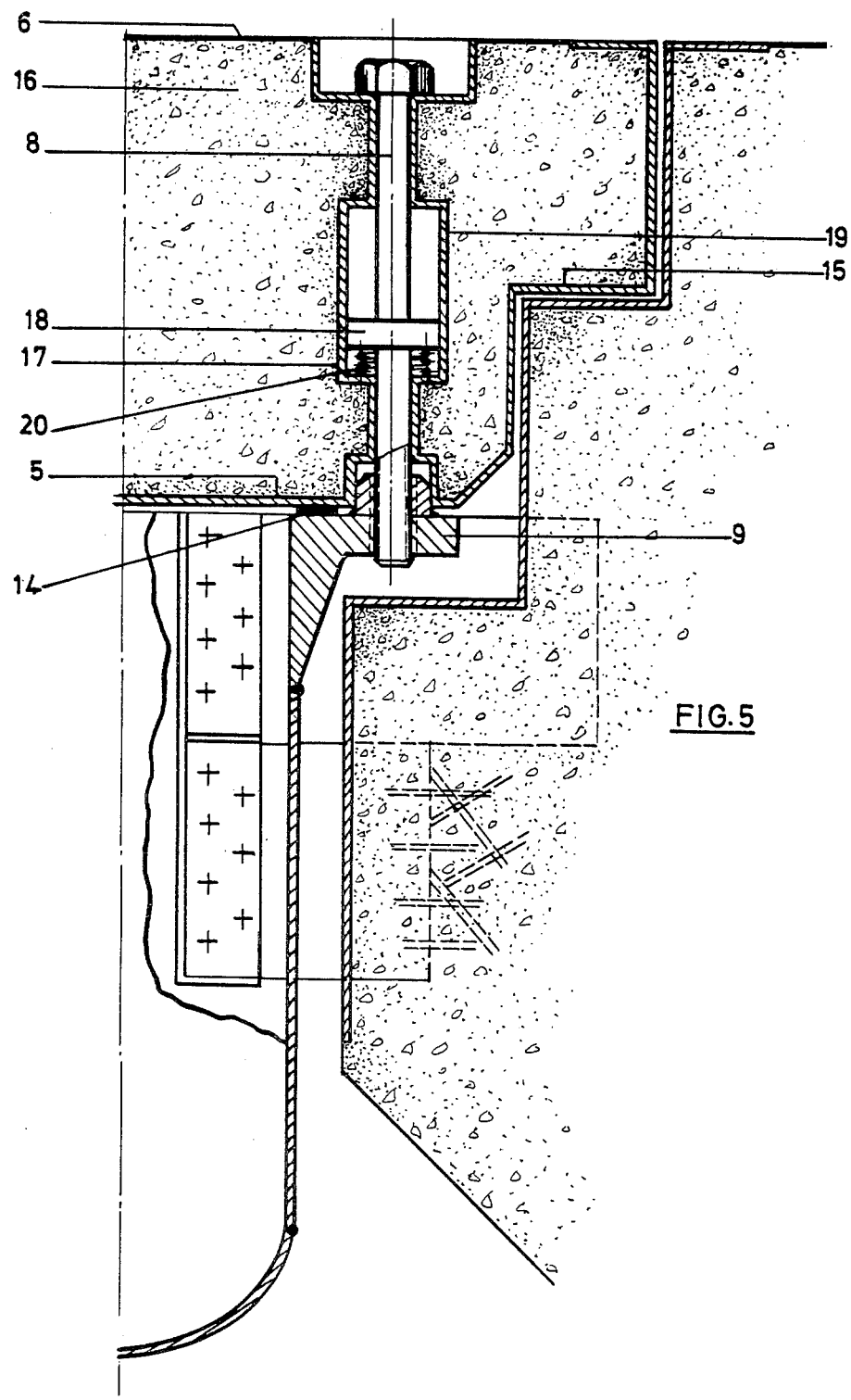
FIG. 5 is an enlarged detailed view of FIG. 2.

Referring now to the embodiment of FIG. 5, between the cover 5 and the flange 9 of the casing 4 sealing means 14 can be placed. The cover 5 has an upper wall 15 top-mounted on the outside, and shaped to conform to the corresponding steps provided in the cell opening. Wall 15, together with the bottom or cover 5, defines a recepticle into which suitable material 16, e.g., concrete, is poured, and which forms radiation shielding. The holes of cover 5 can be surrounded on the upper part by a sleeve or wall 17, which define passages for the fastening bolts 8 to pass through. An enlarged flared or check element 18 is secured in the central portion of the bolt 8 for preventing complete removal of the bolts 8. Between the check element 18 and the bottom of the housing 19, a spring 20, is provided for urging the bolts 8 to their upper limit position when the bolts are completely unscrewed. Alternatively, retaining pins can be provided instead of the aforementioned check-spring system, to retain the bolts in position.

Figure 6:
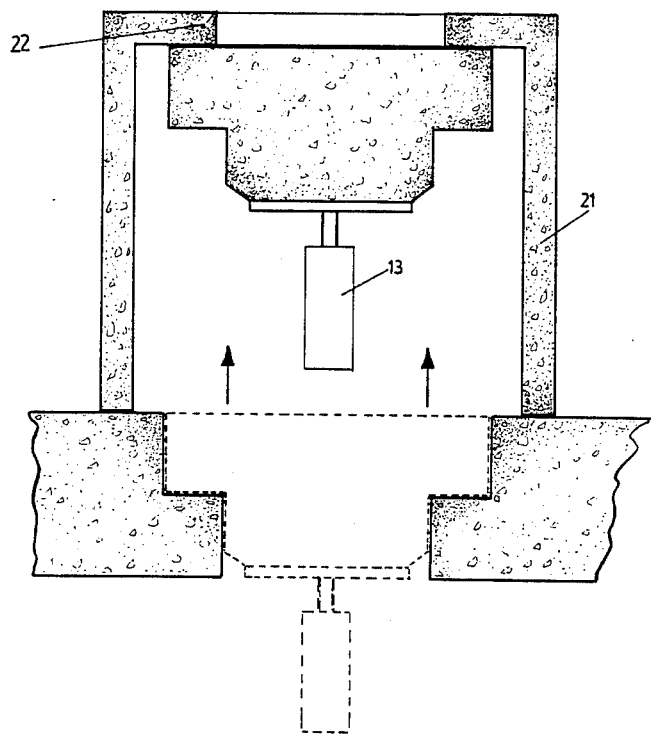
FIGS. 6 and 6A are schematic views showing the manner by which the filter element is extracted and transported.
Figure 6A:
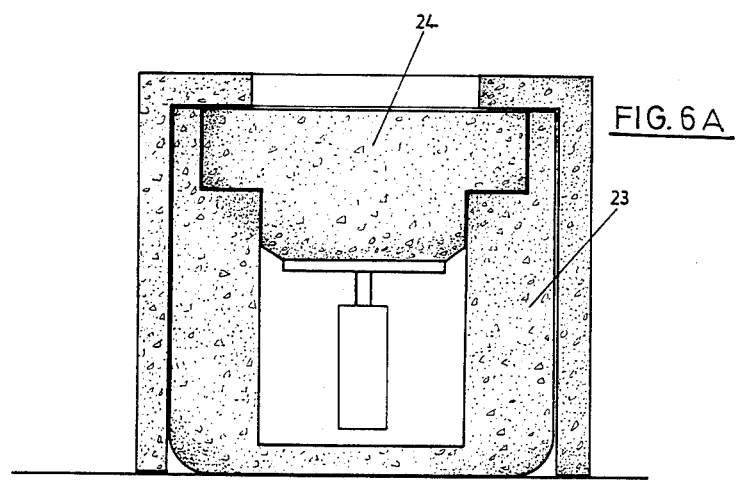

To replace a filtering element 13 in accordance with this invention, it is sufficient to loosen the fastening means or bolts 8, using conventional tools and without the need for special precautions. The operator is completely protected by the cover-shielding 5-6 and by the bolts 8 which remain in the passages. Once the bolts have been loosened, the casing 4 separates and the operator can simultaneously remove the cover-shielding 5-6 and the attached filter element 13. As shown in FIGS. 6 and 6A, a bell 21 is initially positioned over the cover-shielding 5-6 (shown in phantom lines). The filter element 13, without the casing 4, is positioned within the protecting bell 21 and removed to the transportation cask 23 described hereinbelow.

To the filtering element 13, the bell 21 is provided with an upper opening 22, which allows the lifting elements (not shown) for the cover-shielding 5-6 to pass. The cover-shielding 5-6 is lifted and supported up the inside surface adjacent the opening 22 thereby closing it to provide protection against radiation. Immediately afterwards the bell 21 is lifted together with the cover-shielding 5-6 in position and the suspended filtering element 13, and placed over the cask 23 where it can be safely transported for further processing. As shown in FIG. 6A, the cask 23 is formed with an opening 24 which is shaped so that it can be closed by the positioned cover-shielding 5-6 thereby completely enclosing the spent filter element 13 within the provided cavity. The cover-shielding 5-6 is later reused after suitable cleaning and decontamination operations are carried out.

The cover-shielding 5-6 is then provided with a new filter element 13 which obviously does not contain any radioactive particles as it is repositioned over the filter casing 4. The cover-shielding 5-6 can be provided with appropriate markings to insure proper repositioning with respect to the filter casing 4. Additionally, suitable guiding elements may be provided between the casing flange 9 and the cover-shielding 5-6, which permit progressive self centering of the cover-shielding when lowered to its final positioning. By this procedure the fastening elements 8 are situated in the correct position for fastening to the casing flange 9.

Although the present invention has been sufficiently described hereinabove, it should be pointed out that the present invention is not to be construed as being limited by the preferred embodiments. Modifications may be made without departing from the inventive concept herein disclosed.

What is claimed:

1. In a filtering system for the treatment of radioactive fluids wherein said filter assembly is surrounded by chamber walls forming a radiation shielding, the improvement comprising:
   a filter casing secured to a wall of said radiation shielding,
   a filter element removably positioned in said filter casing,
   a filter casing cover including radiation shielding means for said filter element, said filter casing cover and radiation shielding means being shaped to form a removable closure in one of said radiation shielding walls,
   said filter element being suspended from said filter casing cover such that the removal of said filter casing cover and said filter element occur together leaving said filter casing in position.

2. The filtering system of claim 1 wherein said filter casing includes a flange adapted to receive fastening elements which extend through said casing cover.

3. The filtering system of claim 2 wherein said casing flange is of an outer diameter greater than the casing and is positioned within a recess formed in said surrounding wall.

4. The filtering system of claim 2 wherein said fastening elements include retaining means for preventing removal from said cover and radiation shielding means.

5. The filtering system of claim 2 wherein said fastening elements include spring means for urging said elements upward.

6. The filtering system of claim 1 wherein said filter casing is secured to surrounding walls by projecting arms.

7. The filtering system of claim 1 wherein said filter casing cover includes sealing means for providing fluid tight seal with said filter casing.

8. The filtering system of claim 1 wherein said radiation shielding means is adapted to be removable from said chamber wall and to be positioned in a shielded cask for disposal of said element.

9. The filtering system of claim 1 wherein said cover and radiation shielding include a plurality of elongated bolts capable of being acted on at the exposed portion of the radiation shielding without being subjected to unshielded radiation.

10. The filtering system of claim 1 wherein said filter casing cover is an integral part of said radiation shielding means.

11. The filtering system of claim 10 wherein said radiation shielding means is concrete.

12. The filtering system of claim 1 wherein said radiation shielding means is concrete.

* * * * *